June 24, 1930.    N. J. SCHAAL    1,767,900
SOLDER HORN
Filed April 26, 1927    2 Sheets-Sheet 1
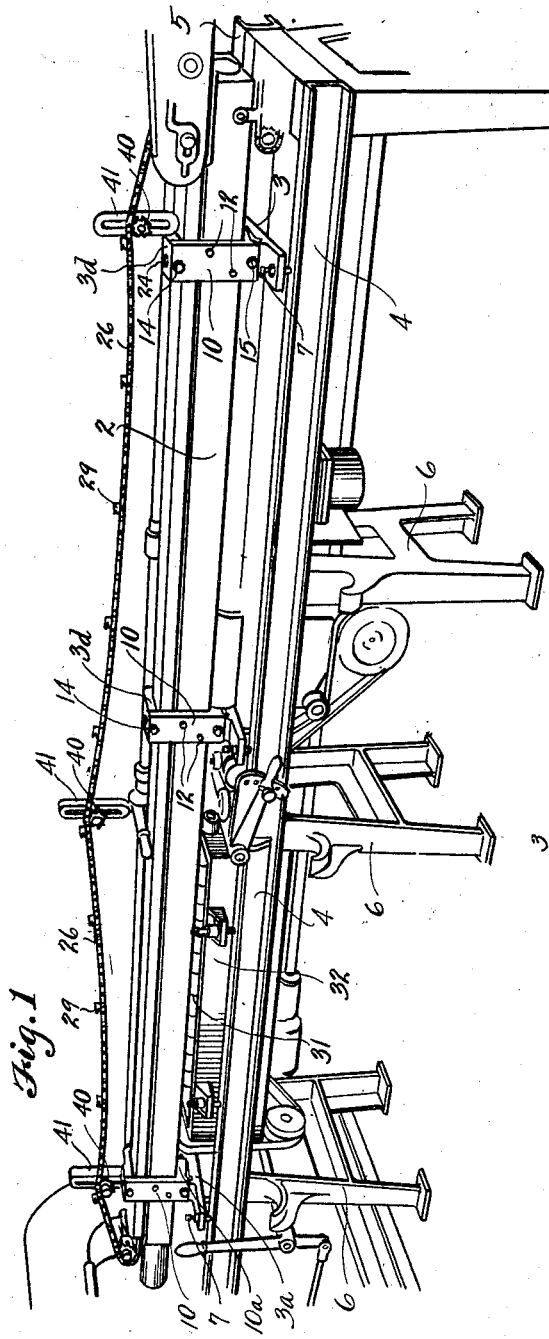
INVENTOR
NORBERT J. SCHAAL
BY
Richard J. Cook
ATTORNEY June 24, 1930.  N. J. SCHAAL  1,767,900
SOLDER HORN
Filed April 26, 1927   2 Sheets-Sheet 2
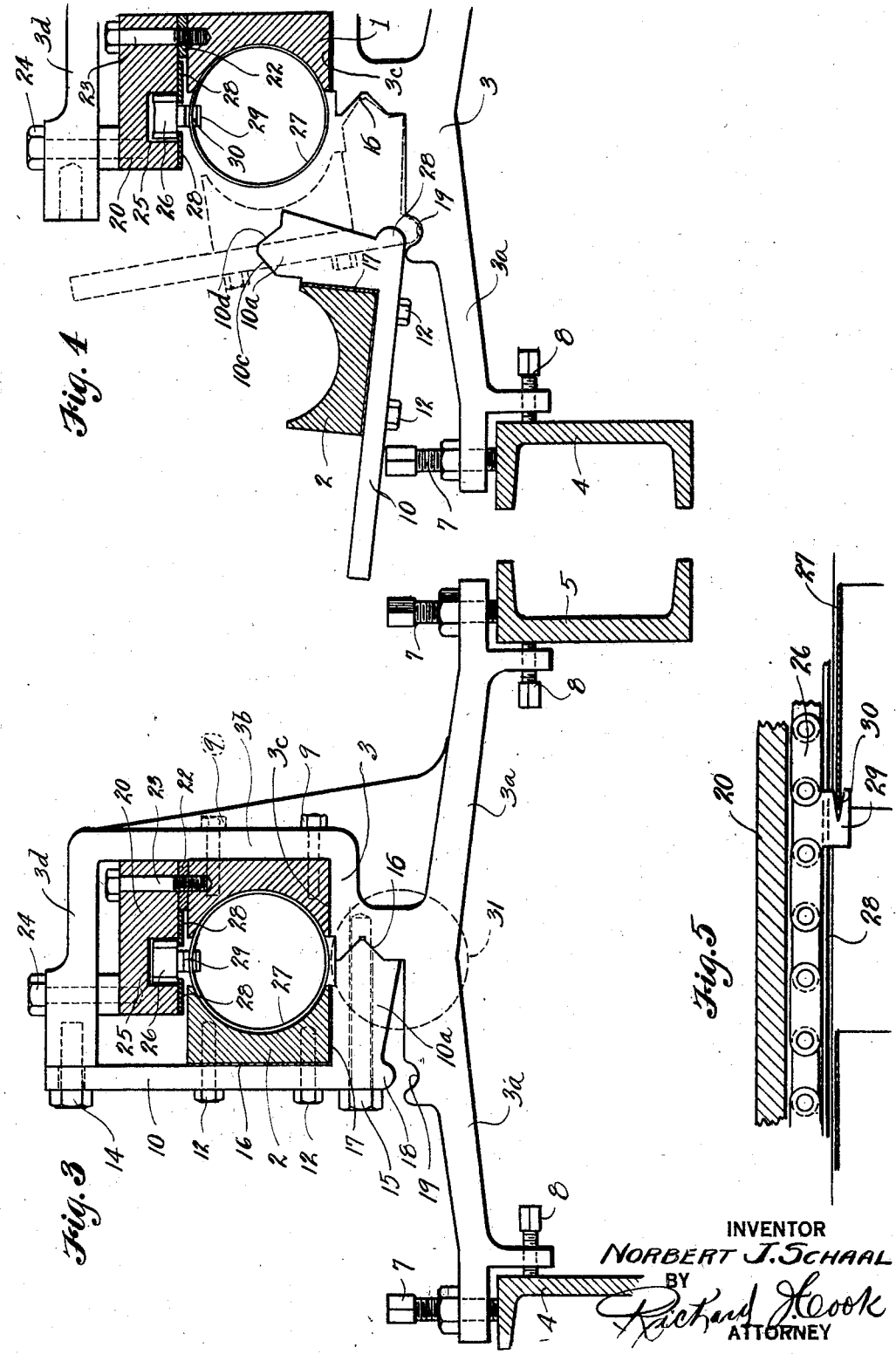
INVENTOR
NORBERT J. SCHAAL
BY
Richard H. Cook
ATTORNEY Patented June 24, 1930

1,767,900

UNITED STATES PATENT OFFICE

NORBERT J. SCHAAL, OF SEATTLE, WASHINGTON, ASSIGNOR, BY MESNE ASSIGNMENTS, TO CONTINENTAL CAN COMPANY, INC., OF NEW YORK, N. Y., A CORPORATION OF NEW YORK

SOLDER HORN

Application filed April 26, 1927. Serial No. 186,699.

This invention relates to can making machinery and particularly to improvements in what is known in the art as the solder horn, which serves for guiding the can bodies while being carried through the soldering and cooling stages of their manufacture.

Explanatory to the invention, it will be stated here that, there are now two types of horns in general use for this purpose, namely, the inside horn and the outside horn.

The inside type consists of a cylindrical horn that is slightly smaller in diameter than the can bodies themselves and which has a length that is equal to the combined lengths of the soldering and cooling sections of the body making machine. The bodies are advanced on this horn past the solder roll by a conveyer chain that operates adjacent thereto and which is equipped at regular intervals with lugs or the like for engaging with the bodies.

The inside type of horn was the first to be developed and was satisfactory with slow speed machines but with the increased speeds which became necessary as the industry of can making progressed, certain faults became apparent that lead to the development of the outside horn. One of the principal faults was that resulting from the transmission of vibration from the body making machine to the horn and it practically limited the economical speed of production. This caused the can bodies to scoop up solder from the solder roll and it also disturbed the solder applied to the seams before it solidified. An attempt was made to remedy this undesirable result by entirely disconnecting the horn from the vibrating parts of the machine, but this was found to be both impractical and undesirable because of the peculiar problems met in supporting the horn. Solder scooping was also caused with the inside type of horn due to its warping and also because of the method required for guiding the conveyer chain.

In the first development of the outside horn it was made up of a plurality of rods, or tubes, supported in such way as to form a cylindrical guide within which the can bodies were advanced by a conveyer chain. While this development was a step in the right direction, it was not a complete success for the reason that much of the poor design necessitated by the inherent clumsiness of the inside horn was retained in the outside horn. The means for supporting the chain was faulty and resulted in tilting the cans and their scooping solder; light bars were usually used which warped when subjected to heat resulting in inaccurate guiding of the bodies and, in case of a jam, the horn was very difficult to open up.

Summing up: The limiting factor in either type of horn was the disturbing of the solder seam by vibration, the scooping up of extra solder from the solder roll at high speeds and the difficulty and loss of time required for opening up the horn when this became necessary.

In view of the above stated undesirable results, it has been the object of this invention to provide a horn of the outside type which is so constructed and mounted as to be unaffected by the vibration of the body forming machine or any other part used in conjunction therewith; which provides for an equal and ready distribution of heat to all parts and thereby avoids warping or any other irregularity due to heat that might result in inaccurate guiding of the can bodies; which is almost entirely enclosed so as to prevent fumes from the solder pot causing corrosion of the inner surface of the horn and which support the can bodies throughout almost their entire circumferences thus maintaining them in accurate position and preventing their springing out of shape.

It is also an object to provide a horn that may be easily and quickly opened by the detachment of a side element and to provide the removable element with supporting and clamping means that insures accurate closing.

A further object resides in the provision of a conveyer chain guide of novel construction which permits of an adjustment relative to the horn and which holds the chain accurately and causes it to run smoothly and which does not necessitate disturbing the chain when the horn is opened up.

Other objects of the invention reside in the novel features of construction and the combination of parts and in their method of operation as is hereinafter described.

In accomplishing these objects, I have provided the improved details of construction, the preferred forms of which are illustrated in the accompanying drawings, wherein—

Figure 1 is a perspective view of a part of a can body making machine equipped with an outside horn embodied by this invention.

Figure 2 is a side elevation of a part of the horn.

Figure 3 is a cross sectional view of the horn and chain support and guide, taken on line 3—3 in Figure 2.

Figure 4 is a similar view showing the horn opened up.

Figure 5 is a side view of a part of the conveyer chain.

Referring more in detail to the drawings—

The horn in its preferred form of construction comprises the two complemental, opposite side bars 1 and 2 disposed in close relation and having their inner surfaces semi-cylindrically formed so that together they form a perfectly cylindrical guide channel or passage throughout the length of the bars within which the can bodies may be delivered, from the body making machine across the solder roll and cooling interval. The two bars are of solid metal in order to give them sufficient strength and rigidity to withstand their being warped or deformed by heat and also to insure a quick absorption and ready distribution of heat to all parts so as to avoid the tendency toward warping that would be caused by uneven heating or uneven absorption of heat.

The bar 1 is supported by a plurality of frames 3 from horizontal, parallel, beams 4 and 5 which constitute a part of the machine frame and these latter beams, in turn, are supported by a plurality of vertical frames 6 located at spaced intervals along the beams. In the present construction, three of these frames 3 are used, which are located near the opposite ends and centrally of the horn, and each frame comprises laterally extending legs 3$^a$ adapted to rest at their ends on the beams 4 and 5 where they are provided with set screws 7 for adjusting the ends vertically and horizontal set screws 8 for engaging the inner sides of the beams for effecting a lateral adjustment. Extending vertically from the leg forming parts of the frame is a bracket 3$^b$ formed at its inner side with a horizontal seat 3$^c$ upon which the flat base of the bar 1 seats and where it is securely held by screws 9 threaded thereinto through the bracket.

At their upper ends the bracket portions 3$^b$ of the frames have integrally formed, horizontal arms 3$^d$ extending transversely across the horn to which hangers 10 for the bars 2 are attached as presently will be described.

The bar 2 is supported functionally in place by three hangers, each comprising a vertical plate 10 with a laterally extending leg 10$^a$ at its lower end joining the plate at a ninety degree angle and forming a seat upon which the bar is secured, by screw bolts 12 threaded into it through the vertical plate. The upper end of the plate of each hanger is detachably secured to the end of its corresponding frame arm 3$^d$ by a bolt 14 and their lower ends are held securely in position by bolts 15 which extend horizontally through the leg portions and into the bracket piece 3$^b$. After the initial assembly of the two horn sections 1 and 2, any unevenness can be corrected by placing shims, as at 16 and 17, between the outer and bottom surfaces of the bar and the hangers.

To insure against any possible vertical play of the hangers relative to their supporting brackets, they are made in the form of geometrical clamps, each having the end of its leg portion 10$^a$ tapered so as to provide upper and lower surfaces 10$^c$ and 10$^d$, see Fig. 4, adapted to fit the correspondingly tapered surfaces of a notch 16 formed in the adjoining face of the bracket. This provides for accurately reassembling the two horn sections after each opening of the horn, since the tapered ends of the legs insure accurate vertical and transverse positioning and the attaching bolts 14 and 15 insure accurate longitudinal positioning.

When it is desired to open the horn the bar 2 is detached and moved outwardly from bar 1 and for the purpose of rendering this opening easier and also to facilitate its being closed, I have provided each of the hangers at its lower end and adjacent the outside, with a rounded, downwardly protruding rib 18. These are adapted, after the hangers are detached from their supports and dropped downwardly, to seat within correspondingly formed grooves 19 in the upper surface of the underlying leg portions 3$^a$ of the supporting frame 3, thus clearing the tapered end portions of the clamps from their centering sockets in the brackets. The several hangers may then rock outwardly on these pivots from the closed position of the horn, as shown in Figure 3, through the dotted line position and to the full line position of Figure 4, at which they rest on the adjusting screws 7. In closing the horn, it is only necessary to swing the section upwardly on the pivots so as to bring the hangers back into abutment with the brackets and to secure them in place by inserting and tightening the bolts 14 and 15.

Associated with the horn is a conveyer chain guide consisting of a bar 20 that extends the full length of the horn and which overlies and is secured to the bar 1 and also overlaps the top edge of bar 2. This bar is slightly spaced from the bar 1 by an interposed spacing strip 22 and is secured thereby by bolts 23 and to the bracket arm 3$^d$ by bolts 24; the thickness of the strip 22 being dependent upon the particular type of chain and pusher used. In the under side of the bar 20 is a longitudinally extending, downwardly opening groove, or slot, 25 in which a conveyer chain 26 operates for advancing the can bodies which are designated at 27, through the horn. The chain being supported in the groove by flat strips 28—28 that are secured to the bar at opposite sides of the slot. At regularly spaced intervals on the chain, are lugs or pushers 29 adapted to project downwardly between the spaced apart edges of the bars 1 and 2 to engage and advance the can bodies through the horn. These lugs, preferably, are provided with V-shaped notches 30 for receiving the edges of the bodies therein.

The lower edges of the bars 1 and 2 are spaced apart to expose the seams of the can bodies for contact by a revolving solder roll 31 which is mounted closely beneath and parallel with the horn and revolves in a pot 32 in which molten solder is contained; the roll 31 being driven by any suitable mechanism in connection with the driving mechanism of the machine.

In operation of the machine with which this horn is associated, the can bodies are delivered from the body machine by the conveyer chain into the horn and are advanced in the latter through the soldering and cooling stages and finally delivered from the horn. The conveyer chain is of the continuous type and may be supported and driven in any suitable manner, but, as shown in Figure 1, its upper run operates over guide rollers 40 on supports 41 and its lower run passes through the guide channel 25 in the bar 20.

It will be here stated that in the types of horns formerly used the chain lugs, or dogs, whereby the can bodies were advanced would tilt up because the conveyer chain was not well guided. This caused the bodies to scoop solder. Also, slackness and lack of firmness in the belt permitted chattering making it impossible to maintain the notch in the lug at exactly the right height. This resulted in the rear of the can body being lifted or pressed down at which the seam was not parallel with the surface of the solder roll and more solder would be applied at one end than at the other.

In the present construction the chain is accurately guided at top, sides and bottom, instead of being supported only.

With this type of horn there is greater accuracy due to the lack of vibration, the prevention of warping, the increased arc of contact between the inside of the horn and can bodies, the use of an accurate chain guide and positive means for centering the complemental sections of the horn with respect to each other. Furthermore, less time is lost because of the construction that permits the horn to be easily and quickly completely opened, and then accurately closed, and due to this accuracy fewer jams result.

Also, the greater accuracy, smoother operation and lack of vibration all help to eliminate scooping of solder and permit the solder to set in the seams without being disturbed.

Another advantage resides in the fact that with the horn being practically entirely enclosed, corrosion of its inner surface is lessened. Also, the cooling air instead of escaping through open sides, as in most horns of this type, is caused to pass lengthwise through the cans and their cooling is greatly expedited.

Having thus described by invention, what I claim as new therein and desire to secure by Letters-Patent, is:

1. In a can body forming machine, a stationary, outside solder horn comprising complemental rigid bars arranged in parallel relation and provided in adjacent faces with grooves to contact with the periphery of can bodies and together provide a substantially closed guideway within which can bodies may be advanced through their soldering and cooling stages.

2. In a can body forming machine, a stationary, outside solder horn comprising two substantially rigid and heavily constructed bars of solid metal disposed in side by side relation and provided in adjacent faces with grooves to contact with the periphery of can bodies and which together provide a substantially closed guideway within which can bodies may be advanced through their soldering and cooling stages.

3. In a can body forming machine, a stationary, outside solder horn comprising two complemental bars arranged in parallel relation and provided in adjacent faces with grooves to contact with the periphery of can bodies and which together provide a substantially closed guideway within which can bodies may be advanced through their soldering and cooling states; one of said bars being detachably supported and adapted to be removed laterally from assembled relation as a means of opening the horn.

4. In a can body forming machine, a stationary, outside solder horn comprising two complemental, opposite side bars arranged in side by side relation and provided in opposite faces with grooves to contact with the periphery of can bodies which together provide a substantially closed guideway within which can bodies may be advanced through their soldering and cooling stages; one of said bars being detachably supported and removable from assembled relation with the other as a means of opening the horn.

5. In a can body forming machine, a stationary, outside solder horn comprising two substantially rigid bars of solid metal fixed rigidly in close, parallel relation and provided in adjacent faces with grooves to contact with the periphery of can bodies and providing a smooth substantially closed guideway within which can bodies may be advanced; said bars having edges spaced slightly apart for the passage between them of can body conveying means and having their other edges spaced slightly apart for exposing the seams of the body for the application of solder thereto.

6. In a can body forming machine, a stationary, outside solder horn comprising two complemental, opposite side bars arranged in side by side relation and provided in adjacent faces with grooves to contact with the periphery of the can bodies and which together provide a substantially closed guideway within which can bodies may be advanced through their soldering and cooling stages, supporting frames for the horn to which one of said bars is fixed and means detachably secured to the frames for supporting the other of said bars in cooperative relation to the fixed bar.

7. In a can body forming machine, a stationary, outside solder horn comprising two complemental, opposite side bars provided in adjacent faces with cylindrically formed grooves to contact with the periphery of can bodies and which together provide a cylindrical guideway closed throughout the greater part of its circumferential area and within which can bodies may be advanced through their soldering and cooling stages, a plurality of supporting frames for the horn to which one of said bars is fixed and hangers detachably fixed to the frames and supporting the other of said bars in its cooperative relation with the fixed bar and slightly spaced therefrom for the passage between them of can body advancing means.

8. In a can body forming machine, a stationary, outside solder horn comprising two complemental, opposite side bars provided in adjacent faces with grooves to contact with the periphery of can bodies and which together provide a substantially closed guideway within which can bodies may be advanced through their soldering and cooling stages, a plurality of supporting frames for the horn to which one of said bars is fixed, hangers detachably fixed to the frames and supporting the other of said bars in cooperative relation with the fixed bar and slightly spaced therefrom, a chain carrier supported from the first bar, a conveyer chain operable in the carrier and provided with can engaging means extendable into the guideway between the the spaced apart edges of the bars.

9. In a can body forming machine, a stationary, outside solder horn comprising two complemental, opposite side bars provided in adjacent faces with cylindrically formed grooves to contact with the periphery of can bodies and which together provide substantially a closed cylindrical guideway within which can bodies may be advanced through their soldering and cooling stages, a plurality of supporting frames for the horn to which one of said bars is fixed and hangers detachably fixed to the frames and supporting the other of said bars in its cooperative relation with the fixed bar and slightly spaced therefrom, a bar supported lengthwise of the fixed bar and provided with a longitudinal groove registering with the open space between the first bars and a conveyer chain operable in said groove and provided with can advancing means extending into the guideway through said open space between the bars.

10. The combination with a solder horn comprising two complemental, opposite side bars provided in adjacent faces with grooves in contact with the periphery of can bodies and which together provide a substantially closed guideway within which can bodies may be advanced through their soldering and cooling stages, and supporting means for the horn to which one of said bars is fixed and to which the other bar is detachably secured in slightly spaced relation to the fixed bar, of a chain supporting bar mounted on the fixed bar of the horn and having a longitudinally extending groove in its under side, a conveyer chain operable in said groove provided with means thereon whereby cans may be advanced within the horn and chain supporting plates fixed to the bar at opposite sides of the groove.

11. The combination with a solder horn comprising two complemental, opposite side bars forming a guideway within which can bodies may be advanced through their soldering and cooling stages, of a supporting frame for the horn comprising a vertical bracket having a horizontal seat upon which one of said bars is fixed and a lateral arm spaced above the seat, and a hanger detachably secured at its upper and lower ends to the bracket and provided with a seat on which the other bar of the horn is fixed in cooperative relation to the first bar.

12. In a machine of the character described, a plurality of horn supporting frames each comprising a vertical bracket provided with a horizontal, upwardly facing seat and a laterally directed arm spaced above the seat, hangers associated with the brackets each comprising a side member that is disposed at its upper end flatly against the end of a bracket arm and having a horizontal leg at its lower end forming a seat that is alined with the seat of the bracket, means at the upper and lower ends of the said hangers whereby they are detachably secured to the bracket and a solder horn comprising complemental, opposite side bars together forming a closed guideway within which can bodies may be advanced, one of said bars being secured to the brackets on said seats and the other being secured on the seats of the hangers and held thereby in cooperative relation with the other bar.

13. The combination with a solder horn comprising two complemental, opposite side bars forming a guideway within which can bodies may be advanced through their soldering and cooling stages, of a supporting frame for the horn comprising a vertical bracket having a horizontal seat on which one of said bars is fixed and a lateral arm spaced above the seat, and a hanger comprising a vertical plate seated flatly at its upper end against the end of the lateral arm of the bracket and having a horizontal leg at its lower end forming a seat that is alined with the bracket seat and on which the other bar is secured and bolts detachably fixing the upper and lower ends of the hangers to their brackets.

14. The combination with a solder horn comprising two complemental, opposite side bars forming a guideway within which can bodies may be advanced through their soldering and cooling stages, of a supporting frame for the horn comprising a vertical bracket having a laterally opening, V-shaped notch near its base and a horizontal seat above the notch on which one of said bars is fixed, and a lateral arm spaced above the seat, a hanger comprising a vertical plate seated flatly at its upper end against said lateral arm of the bracket and having a horizontal leg at its lower end that is tapered at its end to seat within the notch of the bracket and forming a seat that is alined with the bracket seat and on which the other bar is secured and bolts detachably fixing the upper and lower ends of the hangers to their brackets.

15. In a can body forming machine, a stationary, outside solder horn comprising two complemental, opposite side bars provided in adjacent faces with grooves which together provide a guideway within which can bodies may be advanced through their soldering and cooling stages, a plurality of supporting frames for the horn to which one of said bars is fixed, and hangers detachably fixed to the frames and supporting the other bar in its cooperative relation with the fixed bar; said hangers being adapted for support on the frames when detached and to rock pivotally thereon as a means of opening the horn.

16. In a can body forming machine, a stationary, outside solder horn comprising two complemental, opposite side bars provided in adjacent faces with grooves which together provide a guideway within which can bodies may be advanced through their soldering and cooling stages, a plurality of supporting frames for the horn to which one of said bars is fixed; said frames comprising laterally extending supports beneath the horn provided with upwardly opening grooves, and hangers detachably fixed to the frames and supporting the other bar in cooperative relation with the fixed bar; said hangers being provided at their lower ends with ribs that are adapted, when the frames are detached, to seat within the grooves of the frames and to rock pivotally thereon as a means of opening the horn.

17. In a machine of the character described, a plurality of horn supporting frames, each comprising laterally extending, supporting legs, a vertical bracket provided with a horizontal, upwardly facing seat and a laterally directed arm spaced above the seat, hangers associated with the brackets, each comprising a side member that is disposed at its upper end flatly against the end of a bracket arm and having a horizontal leg at its lower end forming a seat that is alined with the seat of the bracket, means at the upper and lower ends of the said hangers whereby they are detachably secured to the brackets, a solder horn comprising complemental, opposite side bars together forming a closed guideway within which can bodies may be advanced; one of said bars being secured in the brackets on said seats and the other being secured to the hangers and held thereby in cooperative, spaced relation with the other bar, and a chain supporting bar mounted on the fixed bar of the horn and secured thereto and to the horizontal arms of the brackets and having longitudinally extending, downwardly opening grooves registering with the spaces between the bars of the horn, a conveyer chain operable within the groove and plates secured to the bar at opposite sides of the groove to support the chain functionally in place and can advancing means on the chain extending into the guideway.

Signed at Seattle, Washington, this 15th day of April, 1927.

NORBERT J. SCHAAL.